United States Patent
Nishimura

(10) Patent No.: US 6,757,095 B2
(45) Date of Patent: Jun. 29, 2004

(54) SEMICONDUCTOR STRUCTURE AND METHOD FOR TRANSMITTING OPTICAL SIGNALS USING EXTERNALLY SUPPLIED LIGHT BEAM

(75) Inventor: Ken A. Nishimura, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 72 days.

(21) Appl. No.: 10/136,977

(22) Filed: Apr. 30, 2002

(65) Prior Publication Data

US 2003/0201444 A1 Oct. 30, 2003

(51) Int. Cl.⁷ .............................. G02F 1/29; G02F 1/00
(52) U.S. Cl. ..................... 359/318; 359/302; 359/321
(58) Field of Search ................................ 359/240, 247, 359/248, 263, 302, 321, 318, 257; 257/431

(56) References Cited

U.S. PATENT DOCUMENTS 5,621,564 A * 4/1997 Kageyama et al. .......... 359/248
5,920,078 A    7/1999 Frey .............................. 257/14

* cited by examiner

Primary Examiner—David N. Spector

(57) ABSTRACT

A semiconductor structure and method for transmitting optical signals modulates an optical property of the semiconductor structure to selectively transmit portions of an externally supplied light beam as optical signals. The use of the externally supplied light beam eliminates the need to fabricate a light emitting device onto the semiconductor structure. Thus, the semiconductor structure can be based on an indirect bandgap material such as silicon. Consequently, the semiconductor structure can be readily integrated into a conventional silicon-based integrated circuit using conventional semiconductor manufacturing processes.

29 Claims, 13 Drawing Sheets

SEMICONDUCTOR STRUCTURE AND METHOD FOR TRANSMITTING OPTICAL SIGNALS USING EXTERNALLY SUPPLIED LIGHT BEAM

FIELD OF THE INVENTION

The invention relates generally to semiconductor structures, and more particularly to a semiconductor structure that can transmit optical signals.

BACKGROUND OF THE INVENTION

The use of silicon to manufacture integrated circuits (ICs) is a well-developed technology. Since early years of IC development, silicon has dominated the field of electronics to become the most widely used material to fabricate and integrate various electronic devices, in particular transistors such as bipolar and metal oxide semiconductor (MOS) transistors. Consequently, silicon technology has significantly advanced in comparison to other alternative technologies. As a result, silicon-based ICs have a number of advantages over other technologies. For example, silicon-based ICs can be manufactured with relative ease using established semiconductor processes. In addition, an extremely high density of electronic devices can be fabricated on silicon-based ICs. Therefore, silicon-based ICs are currently the preferred embodiment for large-scale high-volume signal processing electronics.

The preference of silicon-based ICs makes silicon the material of choice for fabrication of light emitting devices so that optical functions can be added to signal processing ICs. Unfortunately, silicon is not well-suited for fabrication of light emitting devices. Due to the indirect bandgap of silicon, any light emitting device fabricated using silicon will not emit radiation with significant quantum efficiency. Nevertheless, there has been much effort to incorporate conventional light emitting devices such as GaAs lasers onto silicon-based signal processing ICs to provide optical interconnectivity.

A concern with incorporating conventional light emitting devices onto silicon-based signal processing ICs is that the manufacturing process of such ICs is significantly more complex than convention IC manufacturing process. The complexity of the manufacturing process translates into increase in the manufacturing cost of the ICs with light emitting devices.

In view of these concerns, there is a need for a semiconductor structure and method for transmitting optical signals that can be readily integrated into a silicon-based IC without significantly increasing manufacturing complexity and cost.

SUMMARY OF THE INVENTION

A semiconductor structure and method for transmitting optical signals modulates an optical property of the semiconductor structure to selectively transmit portions of an externally supplied light beam as optical signals. The use of the externally supplied light beam eliminates the need to fabricate a light emitting device onto the semiconductor structure. Thus, the semiconductor structure can be based on an indirect bandgap material such as silicon. Consequently, the semiconductor structure can be readily integrated into a conventional silicon-based integrated circuit using conventional semiconductor manufacturing processes.

A semiconductor structure in accordance with the invention includes a semiconductor substrate, a port positioned over the semiconductor substrate and an optically active region positioned between the port and the substrate. The optically active region has a controllable optical property to manipulate an externally supplied light beam, which is received through the port, such that portions of the light beam can be selectively transmitted through the port as optical signals. The semiconductor substrate may include an indirect bandgap material.

The optically active region includes a controllable layer having the controllable optical property, which is responsive to an electric field, to selectively retard polarization components of the externally supplied light beam, and a reflective element positioned below the controllable layer to reflect the polarization components. The controllable layer may be configured to substantially operate as a quarter-wave plate.

In an embodiment, the optically active region further includes a walk-off layer configured to displace a polarization component of the externally supplied light beam. The walk-off layer and the controllable layer may each include a birefringent material.

In an embodiment, the semiconductor structure includes a polarizing beamsplitter configured to selectively reflect a polarization component of the externally supplied light beam.

In an embodiment, the port includes a single aperture in an opaque layer positioned above the optically active region. In another embodiment, the port includes an input aperture and an output aperture in the opaque layer.

A method of transmitting optical signals in accordance with the invention includes receiving an externally supplied light beam at a port of a semiconductor structure, and modulating an optical property of the semiconductor structure to manipulate the externally supplied light beam so that portions of the light beam are selectively transmitted though the port as optical signals.

In an embodiment, the externally supplied light beam may be received at an input aperture of the port, while the portions of the externally supplied light beam may be transmitted through an output aperture of the port.

In an embodiment, the method further includes separating first and second polarization components of the externally supplied light beam, reflecting the first and second polarization components toward the port, and displacing one of the first and second polarization components depending on polarized orientations of the first and second polarization components. The separating of the first and second polarization components and the displacing of one of the first and second polarization components may be performed by a walk-off birefringent layer of the semiconductor structure.

In another embodiment, the method further includes transmitting a particular polarization component of the externally supplied light beam, reflecting the particular polarization component toward the port, and selectively reflecting the particular polarization component depending on polarized orientation of the particular polarization component. The transmitting of the particular polarization component and selectively reflecting the particular polarization component may be performed by a polarizing beamsplitter.

In an embodiment, the modulating of the optical property of the semiconductor structure includes controlling an electric field within the controllable layer of the semiconductor to change the optical property of the semiconductor structure to a first state. The controllable layer is configured to substantially function as a quarter-wave plate when the semiconductor structure is changed to the first state.

Other aspects and advantages of the present invention will become apparent from the following detailed description, taken in conjunction with the accompanying drawings, illustrated by way of example of the principles of the invention.

DETAILED DESCRIPTION

Figure 1:
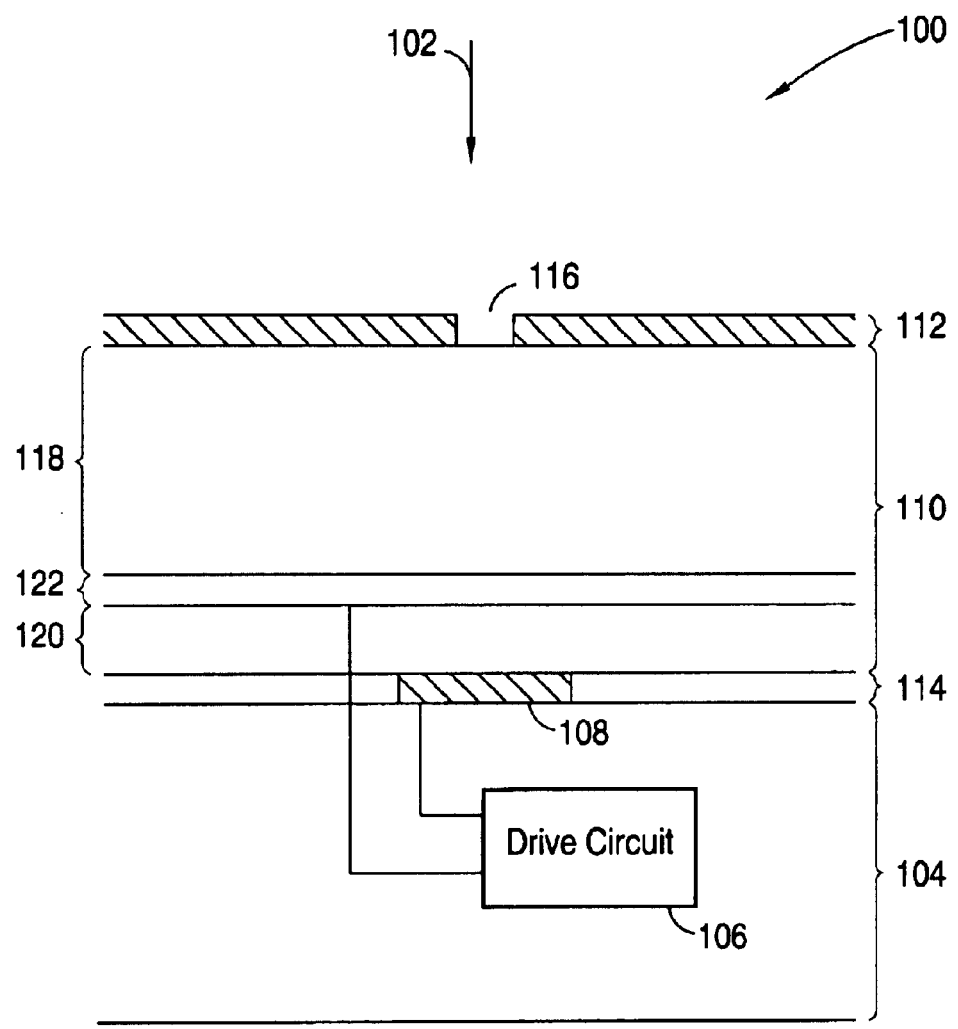
FIG. 1 is a cross-sectional diagram of a semiconductor structure that can transmit optical signals using an externally supplied light beam in accordance with a first embodiment of the present invention.

With reference to FIG. 1, a cross-sectional diagram of a semiconductor structure 100 in accordance with a first embodiment of the invention is shown. The semiconductor structure is designed to selectively reflect portions of an input light beam 102, which may be a continuous wave (CW) light beam, supplied by an external light source (not shown). Thus, the semiconductor structure can "generate" optical signals in the form of reflected light beam segments without having a light emitting device fabricated on the structure. Consequently, the issue of fabricating a light emitting device using an indirect bandgap material, e.g., silicon, is avoided. Therefore, the semiconductor structure can be manufactured using silicon and can be readily integrated into a conventional silicon-based integrated circuit.

As illustrated in FIG. 1, the semiconductor structure 100 includes a silicon substrate 104, a drive circuit 106, a mirror 108, an optically active region 110 and an opaque aperture layer 112. The drive circuit 106 is fabricated in the silicon substrate 104 as part of an integrated circuit. The drive circuit 106 includes various electronic devices to operate the semiconductor structure 100. The other components of the semiconductor structure 100 are fabricated on the silicon substrate 104. Situated first on the silicon substrate 104 is the mirror 108, which is composed of a highly reflective material, such as gold or aluminum. The mirror 108 is located in a dielectric layer 114, such as a layer of $SiO_2$ or $Si_3N_4$. As described in detail below, the mirror 108 is positioned to reflect the input light beam 102, which is propagating toward the silicon substrate 104 from an input/output (I/O) port 116 in the aperture layer 112 of the semiconductor structure 100, such that the reflected portions of the input light beam are emitted from the I/O port of the semiconductor structure as optical signals.

The optically active region 110 of the semiconductor structure 100 is positioned between the aperture layer 112 and the mirror 108. The optically active region includes a layer 118 of walk-off material and a layer 120 of electrically controllable material. The layer of electrically controllable material is positioned below the layer of walk-off material. These layers 118 and 120 are designed to manipulate polarization components of a propagating light beam such that portions of the input light beam 102 reflected from the mirror 108 are selectively transmitted through the I/O port 116 as optical signals.

The walk-off material of the layer 118 is a birefringent material that is configured to displace a particular polarization component of a light beam propagating through the walk-off layer. The walk-off layer 118 operates to separate the input light beam 102 propagating toward the silicon substrate 104 into linear S and P polarization components, which are orthogonal to each other. In the reverse direction, the walk-off layer operates to either recombine the two polarization components or further separate the polarization components, depending on the polarized orientations of the polarization components. As an example, the walk-off layer may be formed from a birefringent material, such as Silicon Carbide, orientated in a particular plane to displace the P polarization component of the input light beam.

The electrically controllable material of the layer 120 is an electrically controllable birefringent (ECB) material, such as liquid crystal cell or a slab of Lithium Niobate. The thickness of the ECB layer 120 is predefined to provide quarter wave retardation for a propagating light beam when an electric field is applied. Thus, in the presence of an electric field, the ECB layer functions as a quarter-wave plate. However, when no electric field is present, the ECB layer becomes optically inactive and does not provide any retardation. Consequently, when an electric field is applied, the ECB layer in conjunction with the mirror 108 operates to switch the polarized orientations of the orthogonal polarization components of the input light beam 102, as described in more detail below. In contrast, when no electric field is applied, the ECB layer becomes optically passive and allows the orthogonal polarization components of the input light beam to pass through the ECB layer without any change in the polarized orientations of the polarization components.

As illustrated in FIG. 1, the optically active region 110 further includes a layer 122 of conductive material, which is positioned over the ECB layer 120. The conductive layer 122 operates as one of two electrodes to selectively generate a lateral electric field within the ECB layer. Lateral direction is defined herein as the direction going across the ECB layer. The other electrode is the metal mirror 108, which is positioned below the ECB layer. The conductive layer and the mirror are electrically connected to the drive circuit 106, which supplies the voltage differential to generate the lateral electrical field across the ECB layer. The drive circuit may include transistors and other electrical components to selectively supply voltages to the conductive layer and the mirror to control the optical property of the ECB layer. The conductive layer 122 may be a layer of Indium Tin Oxide (ITO). Since ITO is transparent, an ITO layer does not impede the propagation of the light beam 102 through the conductive layer. Alternatively, the conductive layer may be an opaque layer of metal with an opening to allow the propagating light beam to pass through the conductive layer.

Although not illustrated in FIG. 1, the optically active region 110 may include one or more interface layers between the walk-off layer 1118, the conductive layer 122 and the ECB layer 120. The need for an interface layer between two adjacent layers in the semiconductor structure 100 depends on the type of materials used to form the two adjacent layers. For example, an interface layer of $SiO_2$ may be needed between a layer of metal and a layer of birefringent material. As another example, an index-matching anti-reflection layer or coating may be needed between adjacent layers.

The aperture layer 112 of the semiconductor structure 100 is positioned above the optically active region 110. The aperture layer may be formed by depositing a layer of metal. The deposited metal layer is then patterned to form an aperture, which serves as the I/O port 116. Since the aperture layer is not transparent to light, only a light beam that propagates through the I/O port is transmitted into or out of the semiconductor structure. Thus, if an outgoing light beam (i.e., the input light beam 102 reflected from the mirror 108) is directed to miss the I/O port, then the light beam will not be emitted out of the semiconductor structure.

The semiconductor structure 100 operates in either a passive state or an active state. In the passive state when no electric field is applied to the ECB layer 120, the semiconductor structure operates to allow the input light beam 102, which is received through the I/O port 116 and reflected off the mirror 108, to be emitted back through the I/O port as an optical signal. In the active state when an electric field is applied to the ECB layer, the semiconductor structure operates to prevent the input light beam from being transmitted back through the I/O port. Thus, the semiconductor structure is able to modulate the optical signals transmitted from the I/O port by switching between these two operating states.

Figure 2:
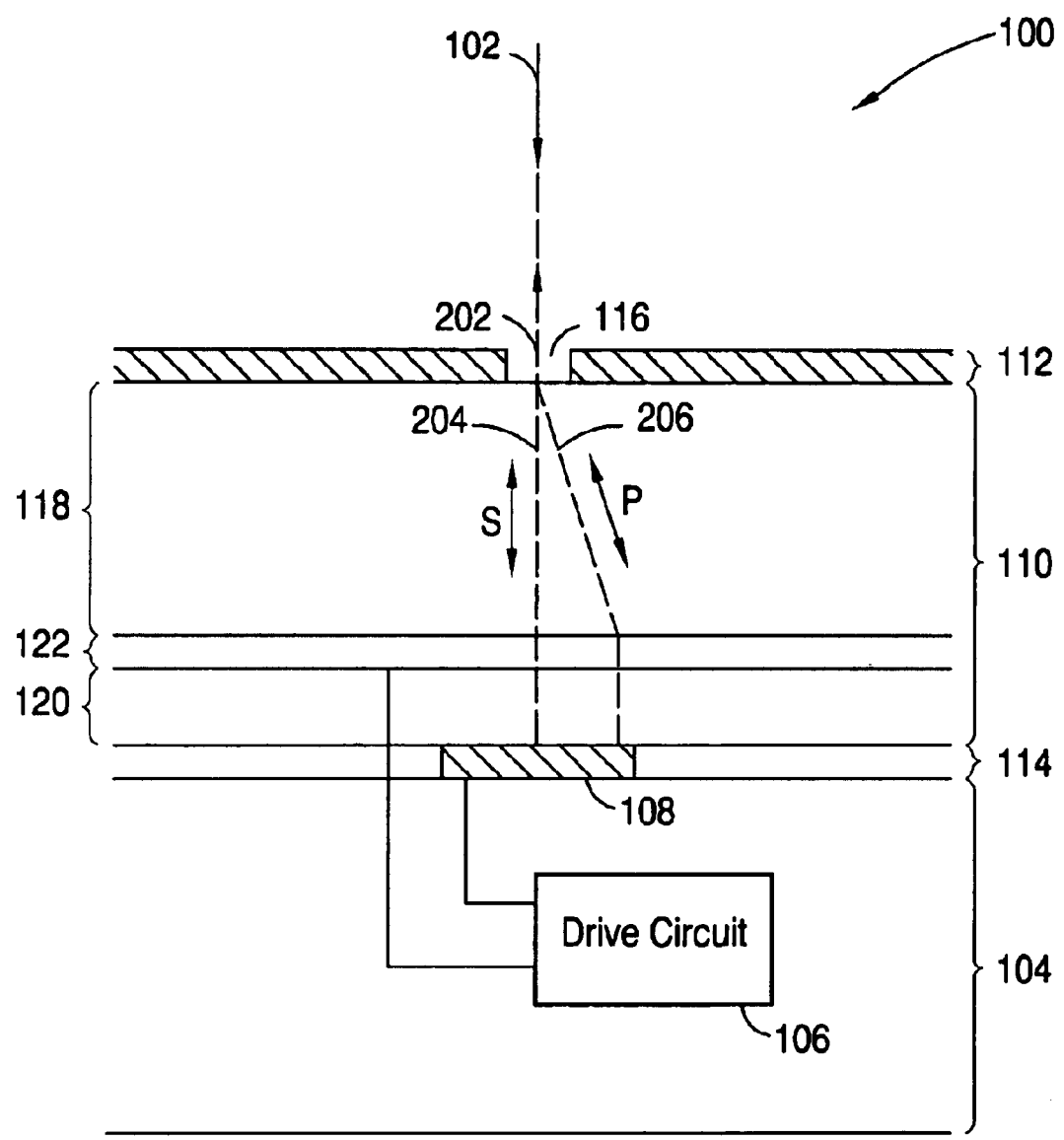
FIG. 2 illustrates the operation of the semiconductor structure of FIG. 1 in the passive state.

The operation of the semiconductor structure 100 in the passive state is now described with reference to FIG. 2, which illustrates the paths of two orthogonal polarization components of the light beam 102 propagating through the semiconductor structure when no electric field is applied to the ECB layer 120. Consequently, in the passive state, the drive circuit 106 does not supply voltages to the conductive layer 122 and the mirror 108, so that there is no lateral electric field across the ECB layer. The input light beam 102 initially propagates through the I/O port 116 of the semiconductor structure along a path 202, which is normal to the surface of the walk-off layer 110. The input light beam is then spatially separated into linear S and P polarization components by the walk-off layer. In the exemplary embodiment, the P polarization component is displaced along the P axis, which is parallel to the orientation of the P polarization component. Thus, the original path 202 of the input light beam is divided into two paths 204 and 206 such that the S polarization component propagates along the path 204 and the P polarization components propagates along the path 206.

The S and P polarization components then propagate through the conductive layer 122 and the ECB layer 120 toward the silicon substrate 104, reflect off the mirror 108, and propagate again through the ECB layer and the conductive layer toward the I/O port 116. Since no electric field is applied to the ECB layer, the S and P polarization components of the light beam 102 are not altered by the ECB layer. After being reflected off the mirror, the S and P polarization components propagate back along their original paths 204 and 206, respectively, toward the I/O port. When the S and P polarization components propagate back through the walk-off layer 118, the P polarization component is displaced by the walk-off layer such that the two polarization components are recombined. The recombined S and P polarization components are then transmitted out of the semiconductor device 100 through the I/O port along the path 202 as an optical signal.

Figure 3:
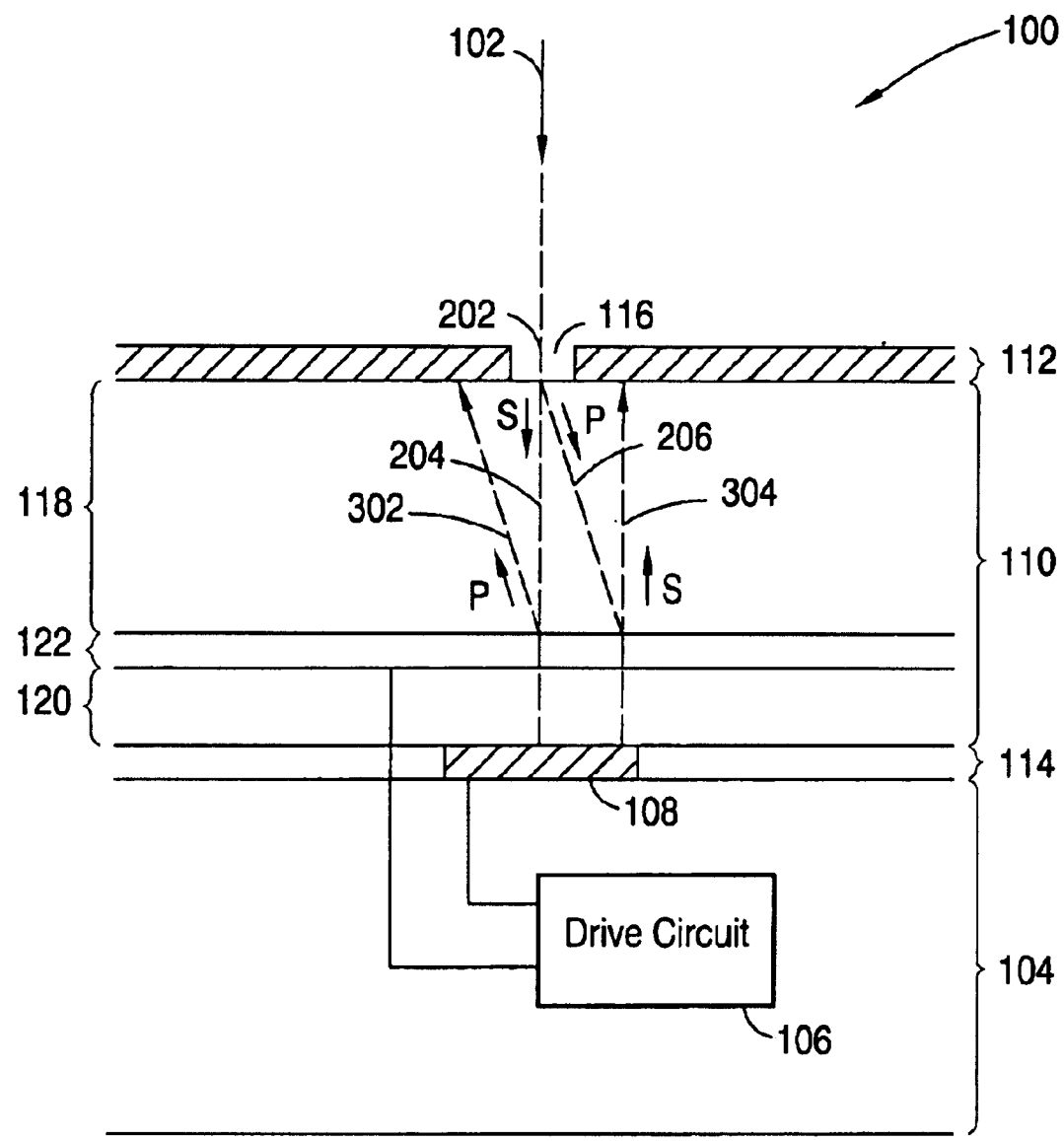
FIG. 3 illustrates the operation of the semiconductor structure of FIG. 1 in the active state.

The operation of the semiconductor structure 100 in the active state is now described with reference to FIG. 3, which illustrates the paths of the two orthogonal polarization components of the input light beam 102 propagating through the semiconductor structure when an electric field is applied to the ECB layer 120. In the active state, the drive circuit 106 supplies voltages to the conductive layer 122 and the mirror 108 to generate the electric field across the ECB layer. When the input light beam propagates through the I/O port 116 of the semiconductor structure along the path 202, the light beam is again spatially separated into linear S and P polarization components by the walk-off layer 118 such that the S polarization component propagates along the path 204 and the P polarization components propagates along the path 206. However, in contrast to when the semiconductor structure is in the passive state, the separated S and P polarization components are then twice retarded by the ECB layer 120 due to the applied electric field. As the S and P polarization components propagate through the ECB layer on the paths 204 and 206 toward the mirror 108, the linear S and P polarization components are converted into circular polarization components by the ECB layer, which functions like a quarter-wave plate in the presence of the applied electric field. The circular polarization components are then reflected off the mirror, which changes the handedness of the circular polarization components. As the reflected circular polarization components again propagate through the ECB layer, the circular polarization components are converted back to linear polarization components. However, due to the conversions caused by the ECB layer, the original S and P polarization components are converted to P and S polarization components. That is, the polarized orientations of the two orthogonal polarization components are switched by the ECB layer. Thus, when the polarization components emerge from the ECB layer toward the I/O port 116, the original S polarization component has been converted to a P polarization component and the original P polarization component has been converted to an S polarization component.

As the converted P and S polarization components propagate through the walk-off layer 118, the P polarization component is displaced by the walk-off layer along a new path 302, which leads the P polarization component to impinge upon the aperture layer 112. Meanwhile, the S polarization component propagates undisturbed by the walk-off layer 118 along another new path 204, which also leads the S polarization component to impinge upon the aperture layer. Consequently, neither the P polarization component nor the S polarization component is transmitted out of the I/O port 116.

Using the passive and active operating states, the semiconductor structure 100 is able to transmit optical signals by selectively modulating portions of the input light beam 102 that are transmitted out of the I/O port 116. In this embodiment, the path of the incoming input light beam is the same path of the reflected portions of the input light beam that are transmitted from the semiconductor structure. Thus, the incoming light beam and the outgoing reflected light beam portions can be spatially separated using a conventional optical device, such as an optical circulator.

Figure 4:
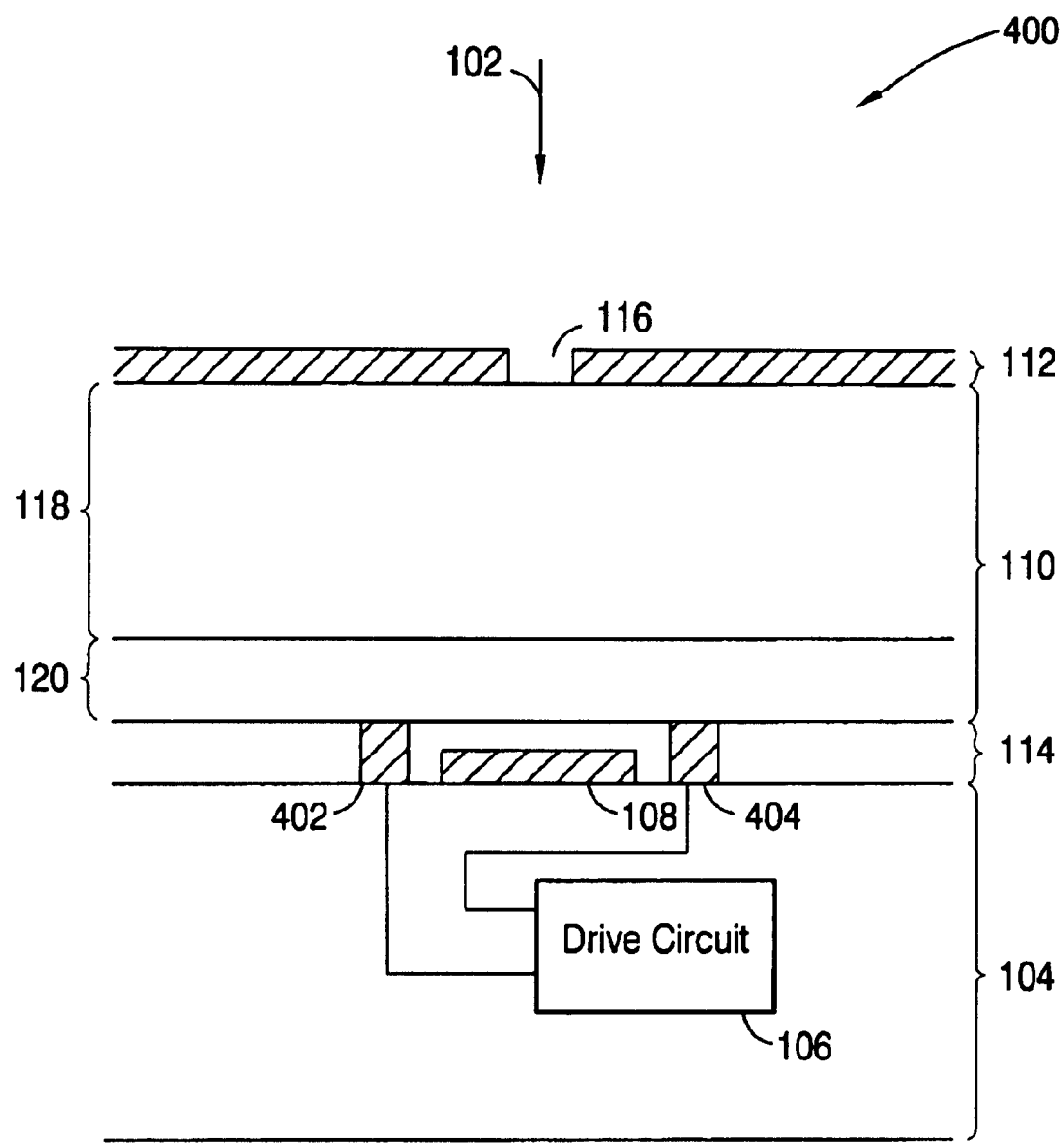
FIG. 4 is a cross-sectional diagram of a semiconductor structure that can transmit optical signals using an externally supplied light beam in accordance with an alternative configuration of the first embodiment of the present invention.

Turning now to FIG. 4, a semiconductor structure 400 in accordance with an alternative configuration of the first embodiment of the invention is shown. The semiconductor structure 400 includes the silicon substrate 104, the drive circuit 106, the mirror 108 within the dielectric layer 114, the optically active region 110 and the aperture layer 112. However, in the alternative configuration, the optically active region does not include the conductive layer 122. As described above, in the semiconductor structure 100 of FIG. 1, the conductive layer and the mirror are used to generate a lateral electric field across the ECB layer 120 during the active state. However, in the semiconductor structure 400 of FIG. 4, a pair of longitudinally positioned electrodes 402 and 404 positioned on the substrate on opposite sides of the mirror is used to generate a longitudinal electric field across a portion of the ECB layer during the active state. Longitudinal direction is defined herein as being orthogonal to the defined lateral direction across the ECB layer. Consequently, in this alternative configuration, the transparent conductive layer is not needed to generate the electric field. Furthermore, the ECB layer is configured to function as a quarter-wave plate in the presence of a longitudinal electric field, rather than in the presence of a lateral electric field.

The operation of the semiconductor structure 400 of FIG. 4 is virtually identical to the operation of the semiconductor structure 100 of FIG. 1. The only significant difference between the two structures is that voltages are applied to the electrodes 402 and 404 of the semiconductor structure 400 to generate the longitudinal electric field in the ECB layer 120. However, the manner in which the two orthogonal polarization components of the light beam 102 are manipulated by the semiconductor structure 400 during the passive and active states is identical to the manner in which the two orthogonal polarization components of the light beam are manipulated by the semiconductor structure 100.

Figure 5:
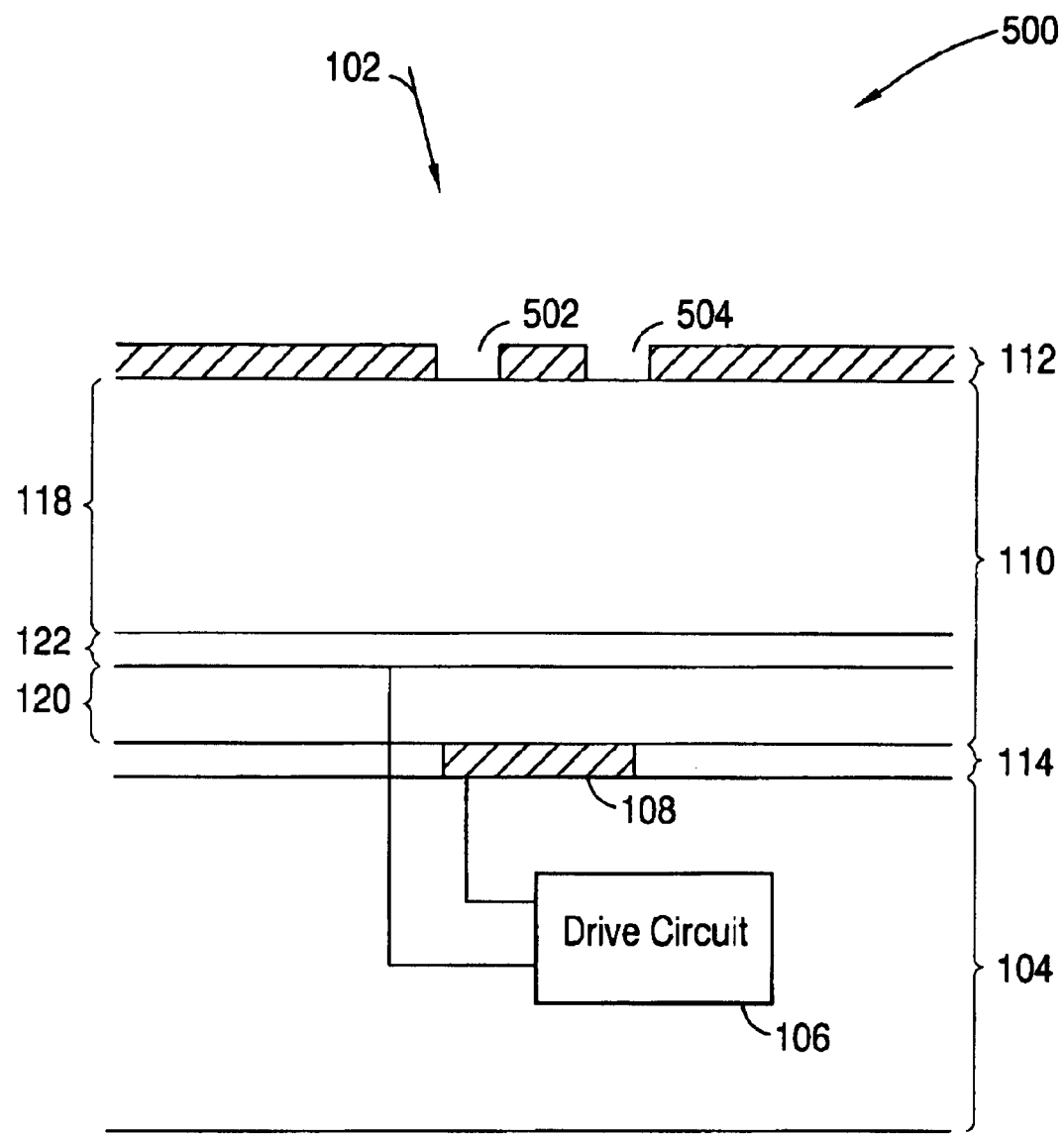
FIG. 5 is a cross-sectional diagram of a semiconductor structure that can transmit optical signals using an externally supplied light beam in accordance with a second embodiment of the present invention.

Turning now to FIG. 5, a semiconductor structure 500 in accordance with a second embodiment of the invention is shown. Similar to the semiconductor structure 100 of FIG. 1, the semiconductor structure 500 includes the semiconductor substrate 104, the drive circuit 106, the mirror 108 within the dielectric layer 114, the optically active region 110 and the aperture layer 112. However, in the second embodiment, the semiconductor structure includes separate input and output ports 502 and 504. Thus, the aperture layer includes two apertures that correspond to the input and output ports. The input port operates to exclusively receive the input light beam 102, while the output port operates to exclusively transmit optical signals, which are portions of the reflected input light beam that are selectively directed to the output port. Since the incoming input light beam and the transmitted optical signals are not on the same path, there is no need to separate the incoming light beam and the transmitted optical signals.

Similar to the semiconductor structure 100 of FIG. 1, the semiconductor structure 500 operates in either a passive state or an active state. In the passive state when no electric field is applied to the ECB layer 120, the semiconductor structure 500 operates to allow the input light beam 102, which is received through the input port 502 and then reflected off the mirror 108, to be transmitted through the output port 504. In the active state when a lateral electric field is applied to the ECB layer 120, the semiconductor structure 500 operates to prevent the input light beam from being transmitted through the output port. Thus, the semiconductor structure 500 is able to modulate the optical signals transmitted from the output port 504 by switching between these two operating states.

Figure 6:
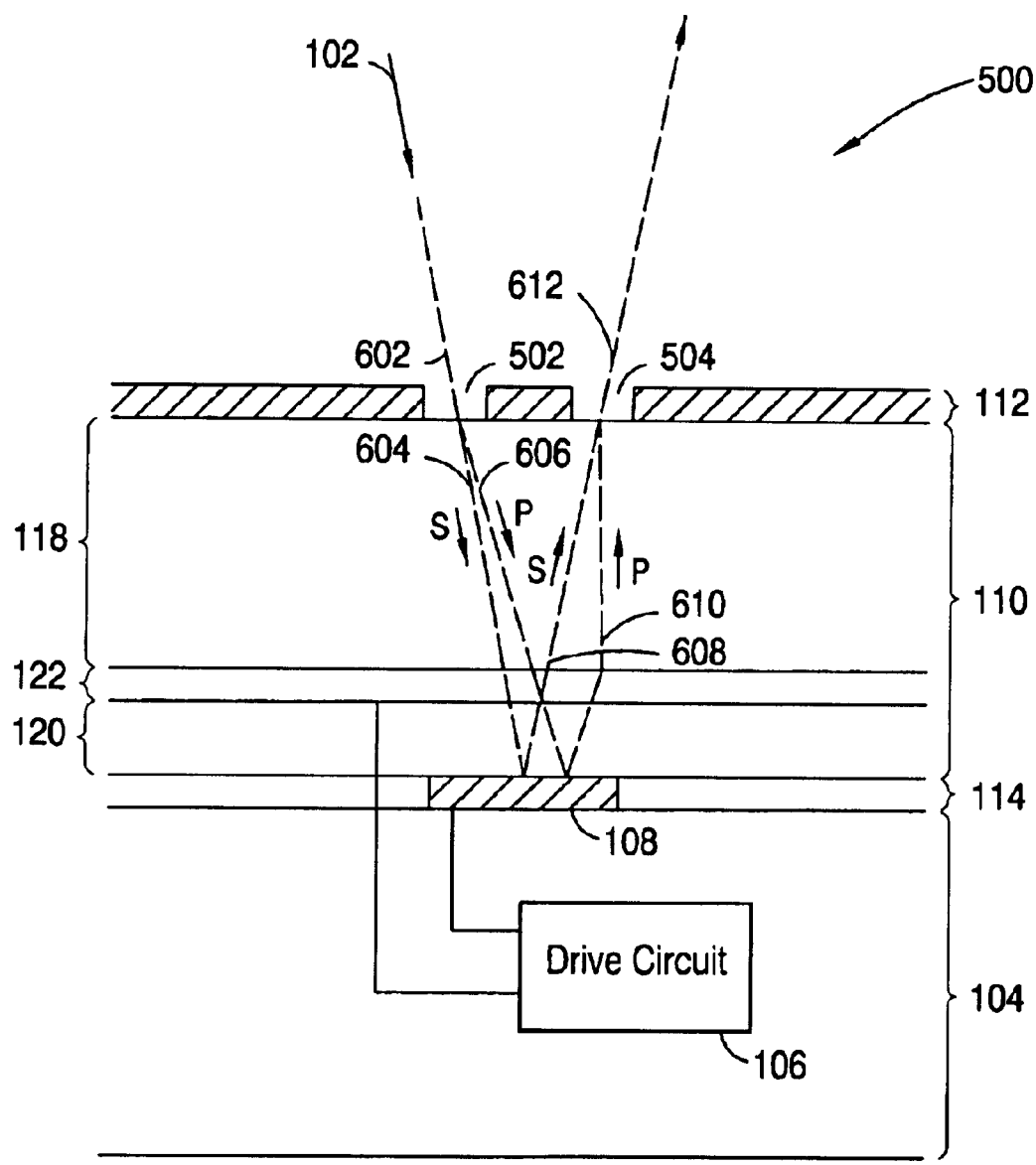
FIG. 6 illustrates the operation of the semiconductor structure of FIG. 5 in the passive state.

The operation of the semiconductor structure 500 in the passive state is now described with reference to FIG. 6, which illustrates the paths of two orthogonal polarization components of the light beam 102 propagating through the semiconductor structure when no electric field is applied to the ECB layer 120. Consequently, in the passive state, the drive circuit 106 does not supply voltages to the conductive layer 122 and the mirror 108 to generate a lateral electric field across the ECB layer. The input light beam initially propagates through the input port 502 of the semiconductor structure along a path 602, which is at a slight angle with the normal to the surface of the walk-off layer 110, as illustrated in FIG. 6. The input light beam is then spatially separated into linear S and P polarization components by the walk-off layer. In this exemplary embodiment, the walk-off layer is configured to displace the P polarization component. Thus, the original path of the input light beam is divided into two paths 604 and 606 such that the S polarization component propagates along the path 604 and the P polarization component propagates along the path 606.

The S and P polarization components then propagate through the conductive layer 122 and the ECB layer 120 toward the silicon substrate 104, reflect off the mirror 108, and propagate again through the ECB layer and the conductive layer toward the output port 504. Since no electric field is applied to the ECB layer, the S and P polarization components of the propagating light beam are not altered by the ECB layer. After being reflected off the mirror, the S and P polarization components propagate along new paths 608 and 610, respectively, toward the output port. When the S and P polarization components propagate through the walk-off layer 118, the P polarization component on the path 610 is displaced by the walk-off layer such that the S and P polarization components are recombined. The recombined S and P polarization components are then transmitted out of the semiconductor structure through the output port along a path 612 as an optical signal.

Figure 7:
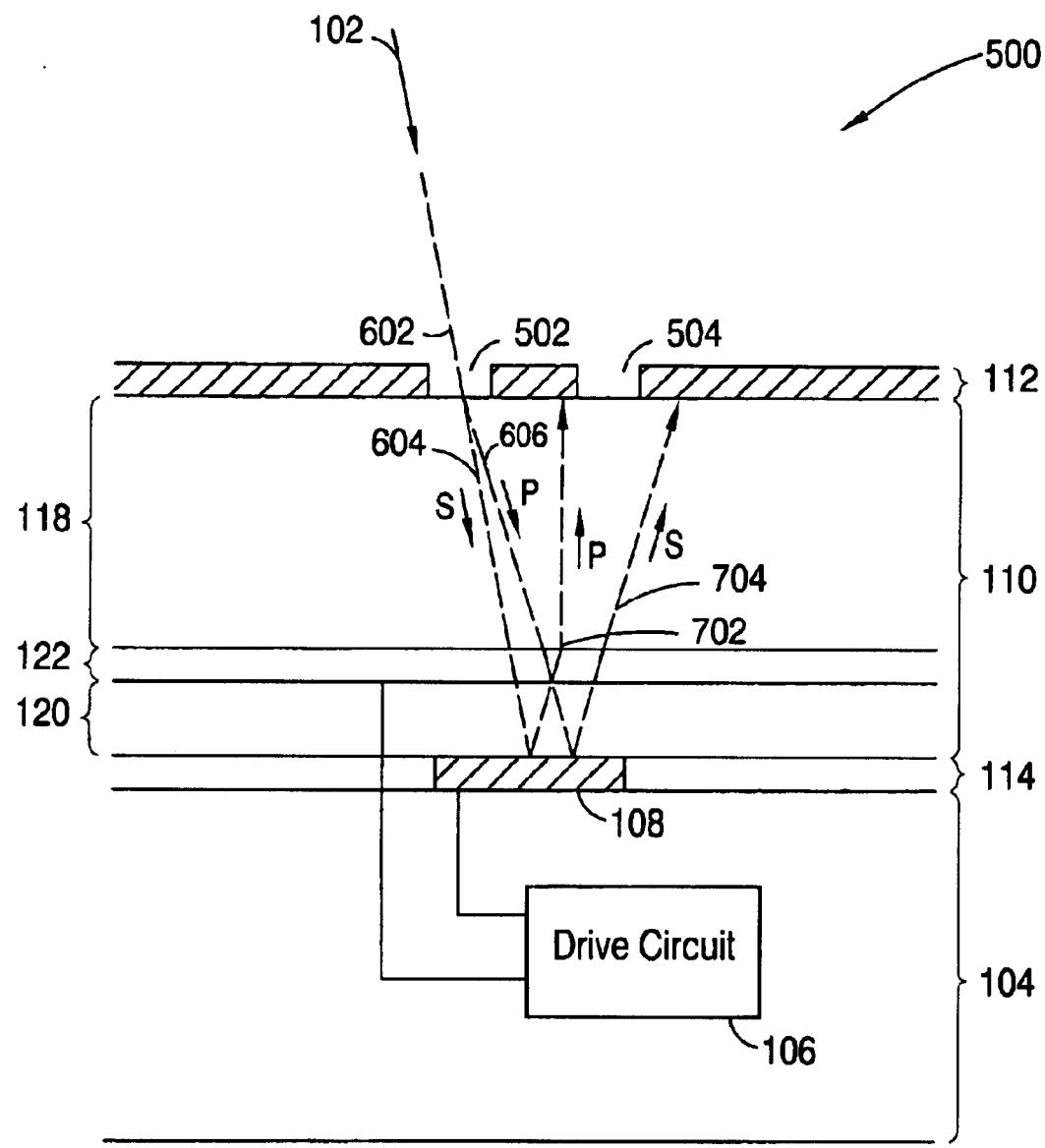
FIG. 7 illustrates the operation of the semiconductor structure of FIG. 5 in the active state.

The operation of the semiconductor structure 500 in the active state is now described with reference to FIG. 7, which illustrates the paths of two orthogonal polarization components of the light beam 102 propagating through the semiconductor structure when an electric field is applied to the ECB layer 120. In the active state, the drive circuit 106 supplies voltages to the conductive layer 122 and the mirror 108 to generate the electric field within the ECB layer. When the input light beam propagates through the input port 502 of the semiconductor structure along the path 602, the light beam is again spatially separated into linear S and P polarization components by the walk-off layer 118 such that the S polarization component propagates along the path 604 and the P polarization components propagates along the path 606.

As the converted P and S polarization components propagate through the walk-off layer 118, the P polarization component is displaced by the walk-off layer such that the P polarization component is directed to impinge upon the aperture layer 112. Meanwhile, the S polarization component propagates undisturbed by the walk-off layer such that the S polarization component is also directed to impinge upon the aperture layer. Consequently, neither the P polarization component nor the S polarization component is transmitted out of the output port 504.

Figure 8:
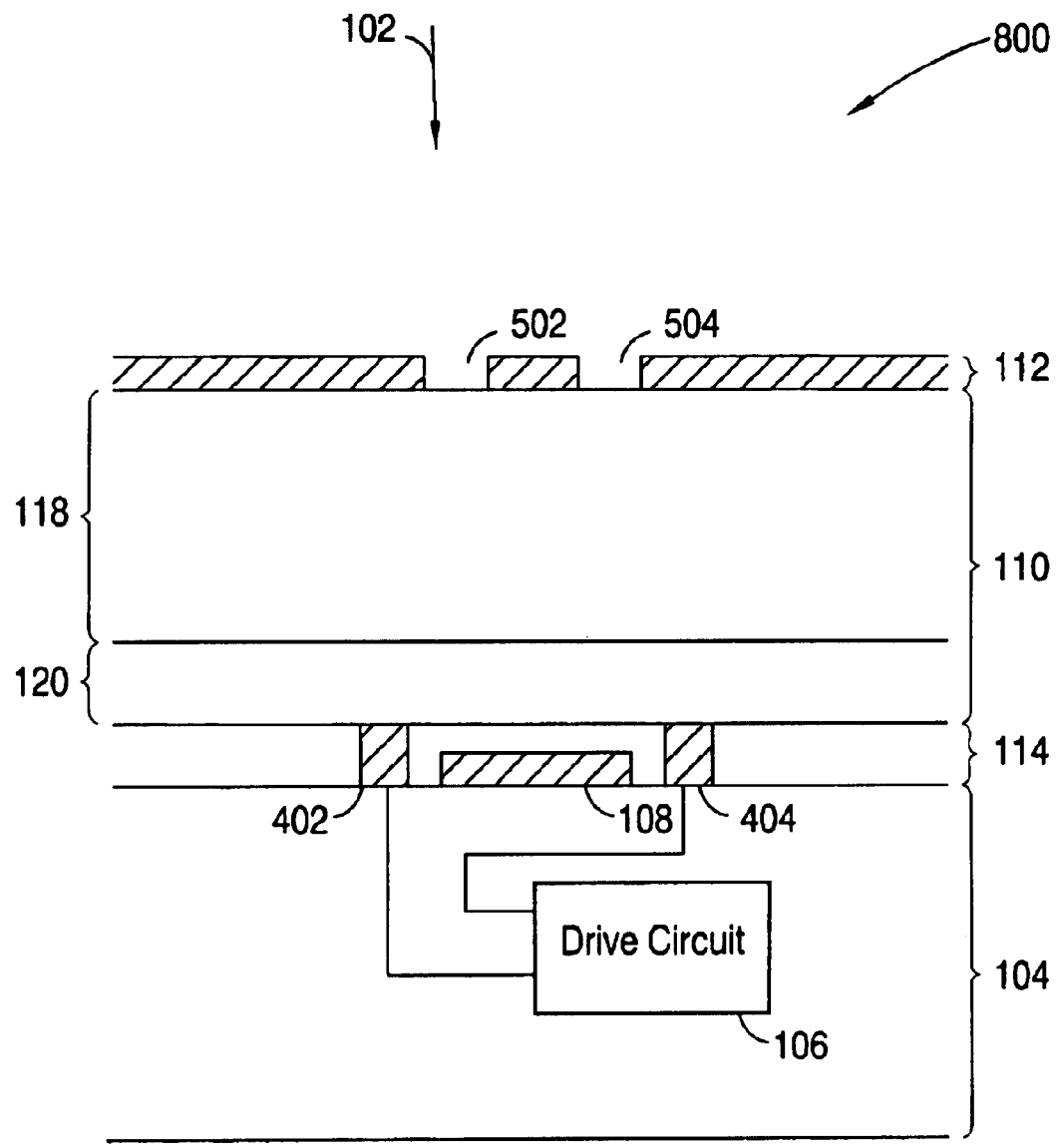
FIG. 8 is a cross-sectional diagram of a semiconductor structure that can transmit optical signals using an externally supplied light beam in accordance with an alternative configuration of the second embodiment of the present invention.

Similar to the semiconductor structure 100 of FIG. 1, the semiconductor structure 500 may also be alternatively configured to generate a longitudinal electric field within the ECB layer 120. In FIG. 8, a semiconductor structure 800 in accordance with an alternative configuration of the second embodiment of the invention is shown. The semiconductor structure 800 of FIG. 8 includes the silicon substrate 104, the mirror 108 with the dielectric layer 114, the optically active region 110 and the aperture layer 112. Similar to the semiconductor structure 400 of FIG. 4, the optically active region of the semiconductor structure 800 does not include the conductive layer 122. Furthermore, the semiconductor structure 800 also includes the pair of longitudinally positioned electrodes 402 and 404, which are used to generate a longitudinal electric field. The manner in which the two orthogonal polarization components of the light beam 102 are manipulated by the semiconductor structure 800 during the passive and active states is identical to the manner in which the two orthogonal polarization components of the light beam are manipulated by the semiconductor structure 500.

Figure 9:
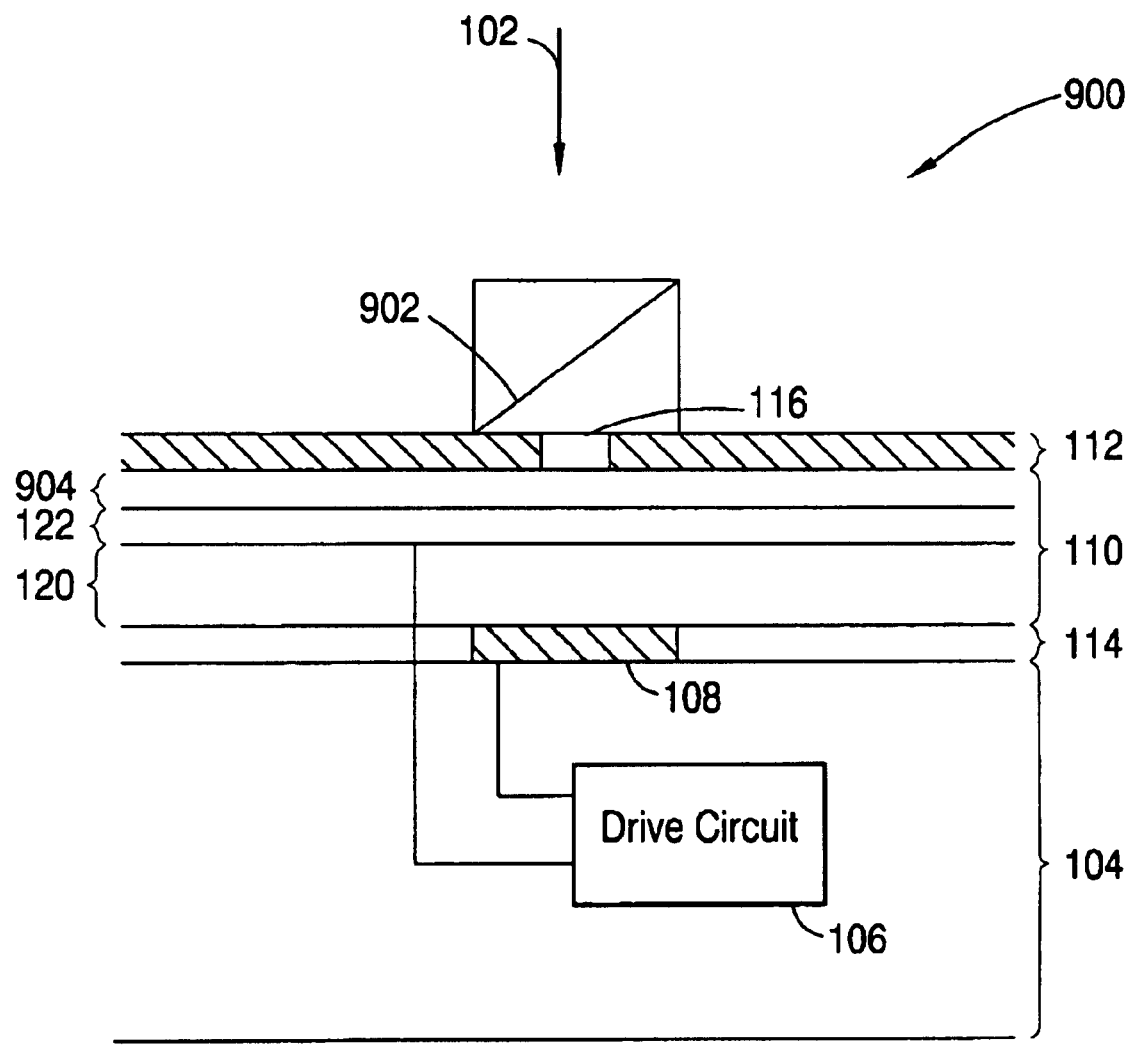
FIG. 9 is a cross-sectional diagram of a semiconductor structure that can transmit optical signals using an externally supplied light beam in accordance with a third embodiment of the present invention.

Turning now to FIG. 9, a semiconductor structure 900 in accordance with a third embodiment of the invention. The semiconductor structure 900 is structurally similar to the semiconductor structure 100 of FIG. 1. The difference between the two semiconductor structures is that the semiconductor structure 900 utilizes a polarizing beamsplitter 902, in lieu of the walk-off layer 118, to separate the propagation direction of the different polarization components. As shown in FIG. 9, the polarizing beamsplitter is positioned over the I/O port 116 to selectively pass and reflect polarization components. If the opaque aperture layer 112 is made of metal, the semiconductor structure 900 includes an insulating layer 904 to electrically isolate the aperture layer and the transparent conductive layer 122. The polarizing beamsplitter is described herein as being configured to pass the S polarization component of a light beam and to reflect the P polarization component of the beam. However, it will be apparent to those skilled in the art that this arbitrary designation can be reversed with no material change to the operation of the structure.

Figure 10:
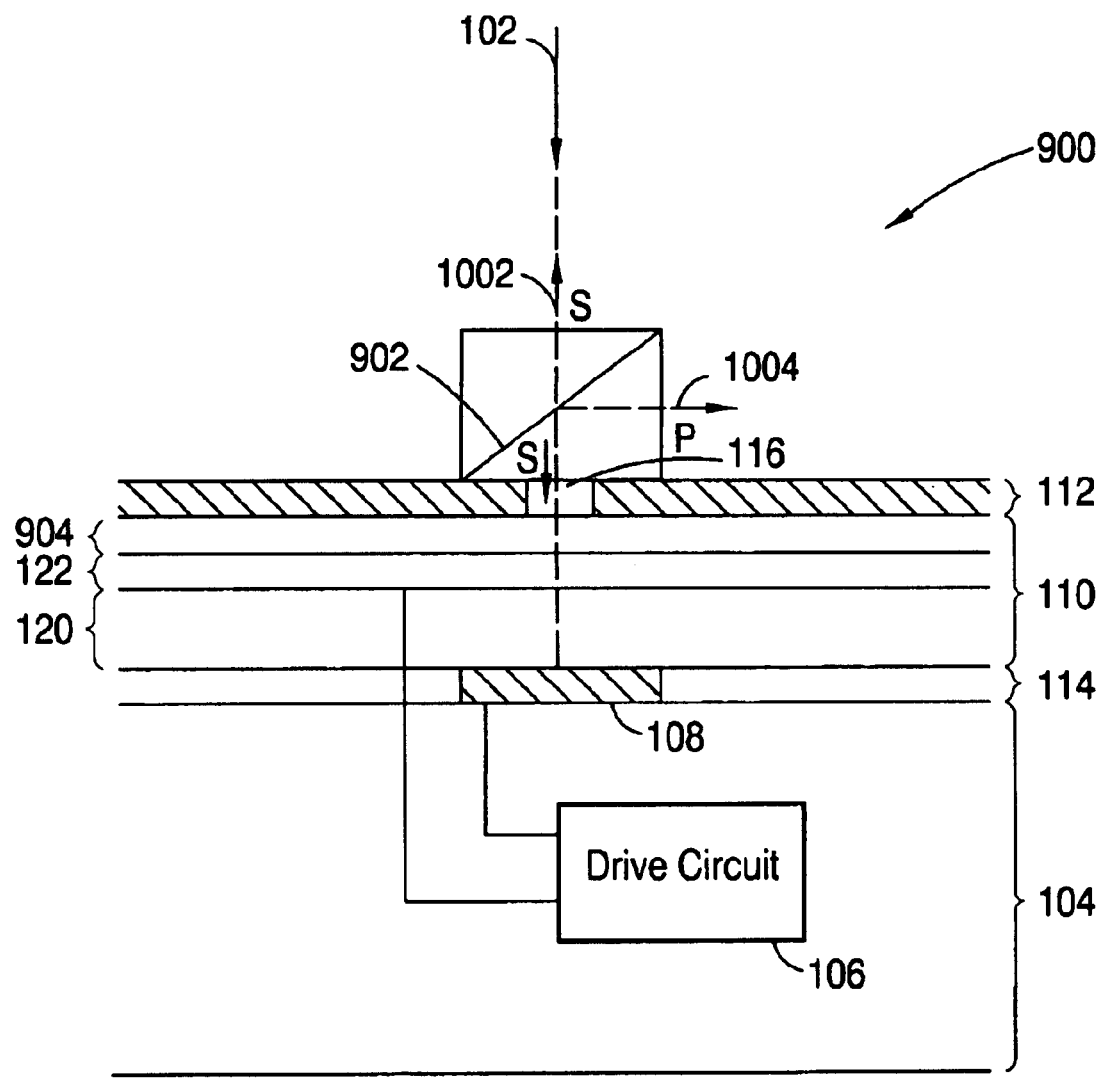
FIG. 10 illustrates the operation of the semiconductor structure of FIG. 9 in both the passive and active states.

The operation of the semiconductor structure 900 is described with reference to FIG. 10. Due to the polarization beamsplitter 902, only the S polarization component of the input beam 102 is allowed to pass through the polarization beamsplitter. In the case where the semiconductor structure is in the passive state, i.e., the ECB layer 120 is optically inactive, the S polarization component is simply reflected off the mirror 108 and is transmitted back through the polarization beamsplitter, as illustrated by the path 1002. However, in the case where the semiconductor structure is in the active state, i.e., the ECB layer is activated to function as a quarter-wave plate, the ECB layer in conjunction with the mirror operates to interchange the polarization axes of polarization components of an incident light beam. Thus, the S polarization component of the input beam 120 is reflected as an output P polarization component. The output P polarization component is then reflected in a direction that is different from the original direction of the input beam, as illustrated by the path 1004. As an example, the polarization beamsplitter may be orientated at forty-five degrees to reflect the output P polarization component in a direction orthogonal to the original direction of the input beam. However, the polarization beamsplitter may be orientated at any arbitrary angle to place the output beam at a desired location.

Figure 11:
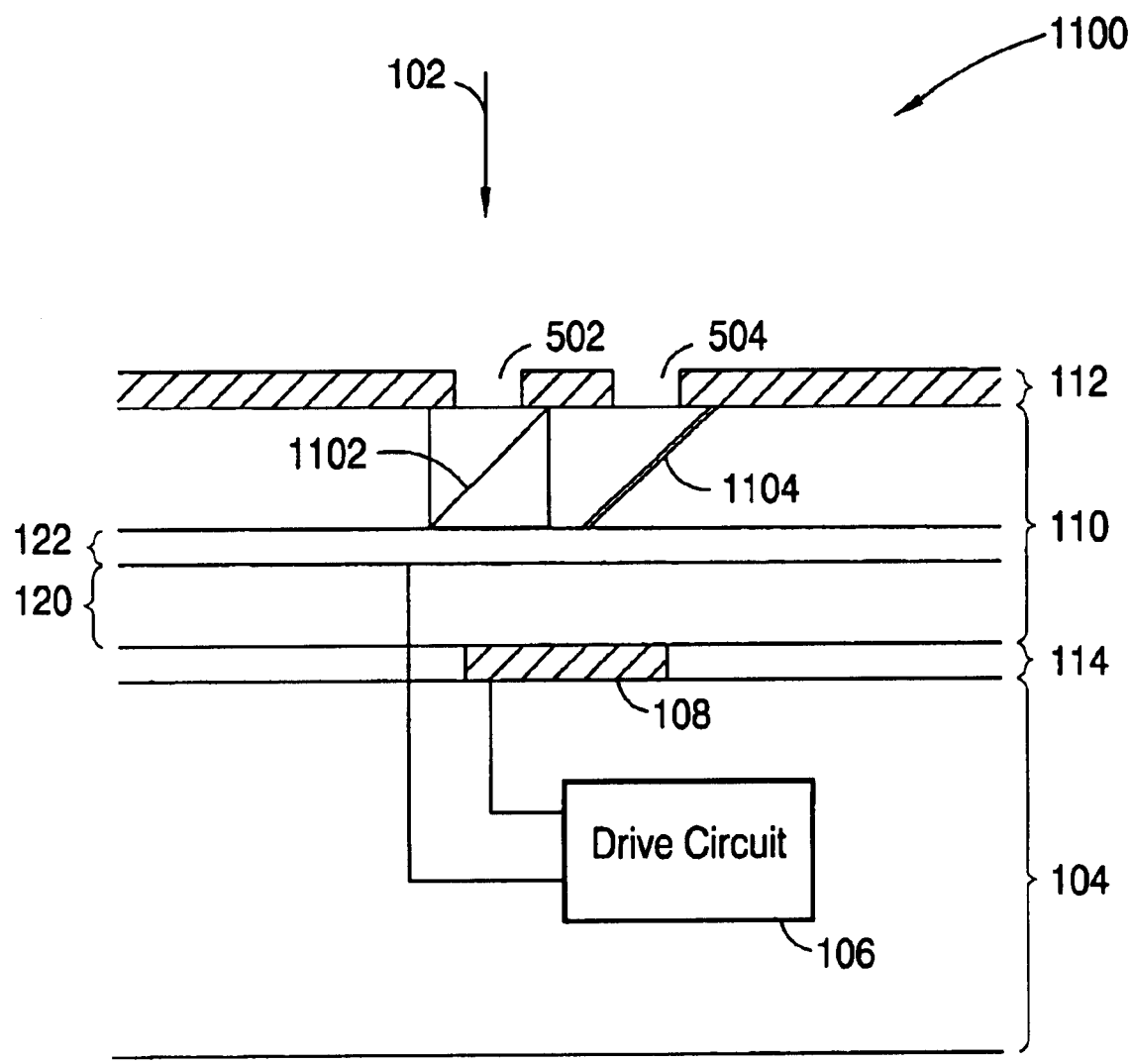
FIG. 11 is a cross-sectional diagram of a semiconductor structure that can transmit optical signals using an externally supplied light beam in accordance with a fourth embodiment of the present invention.

Turning now to FIG. 11, a semiconductor structure 1100 in accordance with a fourth embodiment of the invention. The semiconductor structure 1100 is structurally similar to the semiconductor structure 500 of FIG. 5. One of the differences between the two semiconductor structures is that the semiconductor structure 1100 utilizes a polarizing beamsplitter 1102, in lieu of the walk-off layer 118, to separate the propagation direction of the different polarization components. Another difference is that the semiconductor structure 1100 includes a secondary mirror 1104 to reflect light beams from the polarization beamsplitter through the output port 504. The polarizing beamsplitter is disposed in the optical path between the input port 502 and the transparent electrode 122 to selectively pass and reflect polarization components. Again, the polarizing beamsplitter is described herein as being configured to pass the S polarization component of a light beam and to reflect the P polarization component of the beam at approximately forty-five degrees from the incident angle. However, this arbitrary designation can be reversed with no material change to the operation of the structure. The secondary mirror is longitudinally disposed with respect to the polarization beamsplitter to receive light beams that are reflected from the polarization beamsplitter.

Figure 12:
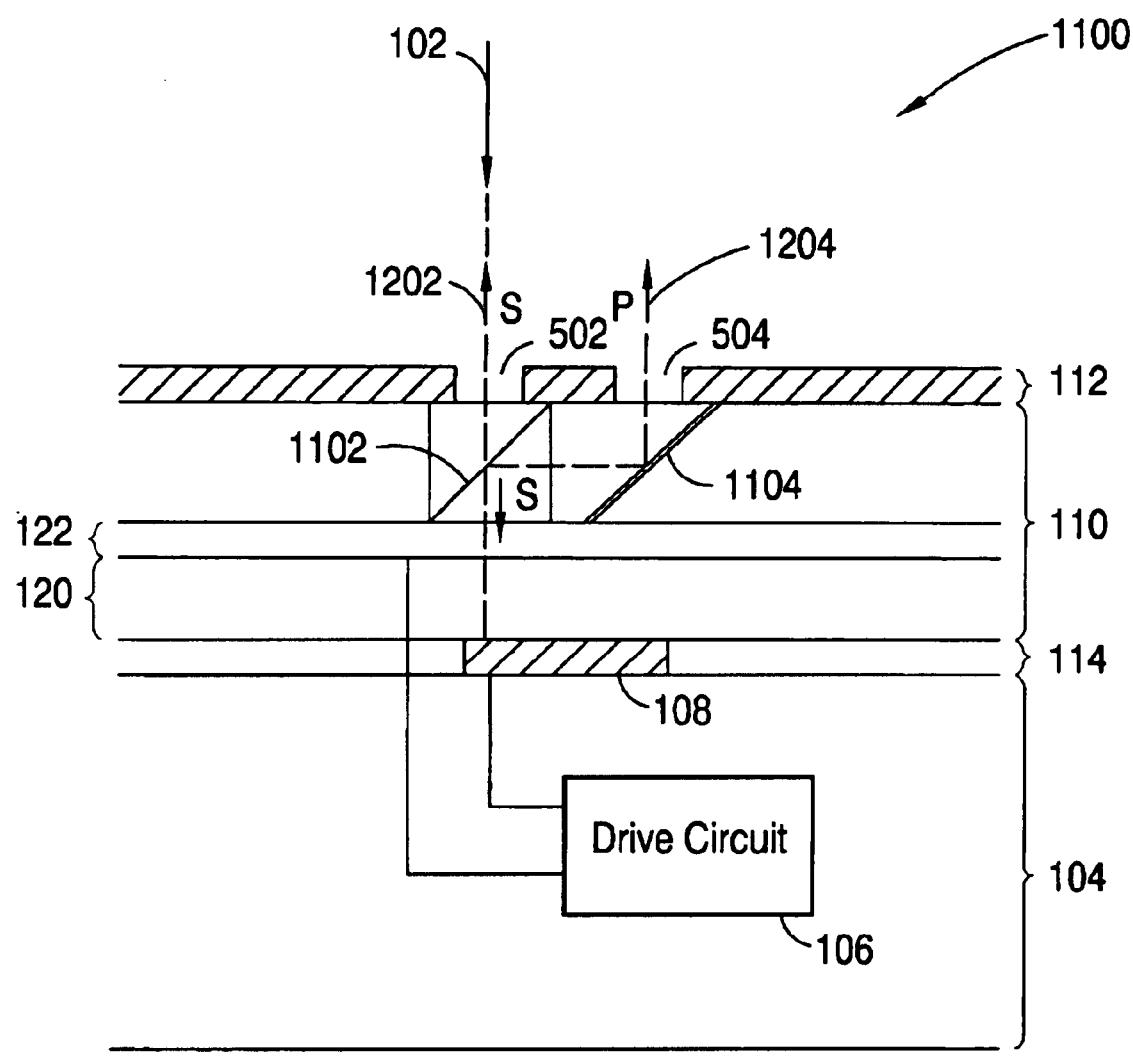
FIG. 12 illustrates the operation of the semiconductor structure of FIG. 11 in both the passive and active states.

The operation of the semiconductor structure 1100 is described with reference to FIG. 12. Due to the polarization beamsplitter 1102, only the S polarization component of the input beam 102 received through the input port 502 is allowed to pass through the polarization beamsplitter. In the case where the semiconductor structure is in the passive state, i.e., the ECB layer 120 is optically inactive, the S polarization component is simply reflected off the mirror 108 and is transmitted back through the polarization beamsplitter and the input port, as illustrated by the path 1202. However, in the case where the semiconductor structure is in the active state, i.e., the ECB layer is activated to function as a quarter-wave plate, the ECB layer in conjunction with the mirror 108 operate to interchange the polarization axes of the polarization components of the incident light beam. Thus, the S polarization component of the input beam is reflected as an output P polarization component. The output P polarization component is then reflected from the polarization beamsplitter toward the secondary mirror 1104, where the output P polarization component is again reflected, exiting the semiconductor structure through the output port 504, as illustrated by the path 1204.

Similar to the semiconductor structures 100 and 500, the semiconductor structures 900 and 1100 may be alternatively configured to include the longitudinally positioned electrodes 402 and 404, instead of the transparent electrode layer 122. Thus, in these alternative configurations, a longitudinal electric field is generated across a portion of the ECB layer 120, rather than a lateral electric field across the ECB layer.

Although the ECB layer 120 of the semiconductor structures 100, 400, 500, 800, 900 and 1100 has been described as being responsive to an electric field in a particular manner, the ECB layer may be configured to response to an electric field in the opposite manner. Thus, the ECB layer may be configured to become optically inactive when an electric field is applied and to become optically active when no electric field is applied. In this configuration, when an electric field is applied to the ECB layer, the ECB layer does not provide any retardation for orthogonal polarization components of an incident light beam. However, when no electric field is applied, the ECB layer functions as a quarter-wave plate to switch the polarized orientations of the polarization components.

An advantage of the described semiconductor structures is that a single light source, e.g., a single laser, can be used to supply input light beams to multiple semiconductor structures, which can individually transmit optical signals using the externally supplied light beams. As an example, using a beamsplitter, the light beam from the single light source can be separated into multiple beams and transmitted to the semiconductor structures. Thus, a multi-channel optical transmitter can be fabricated using a single laser and an array of semiconductor structures, which translates into significant decrease in manufacturing cost.

Figure 13:
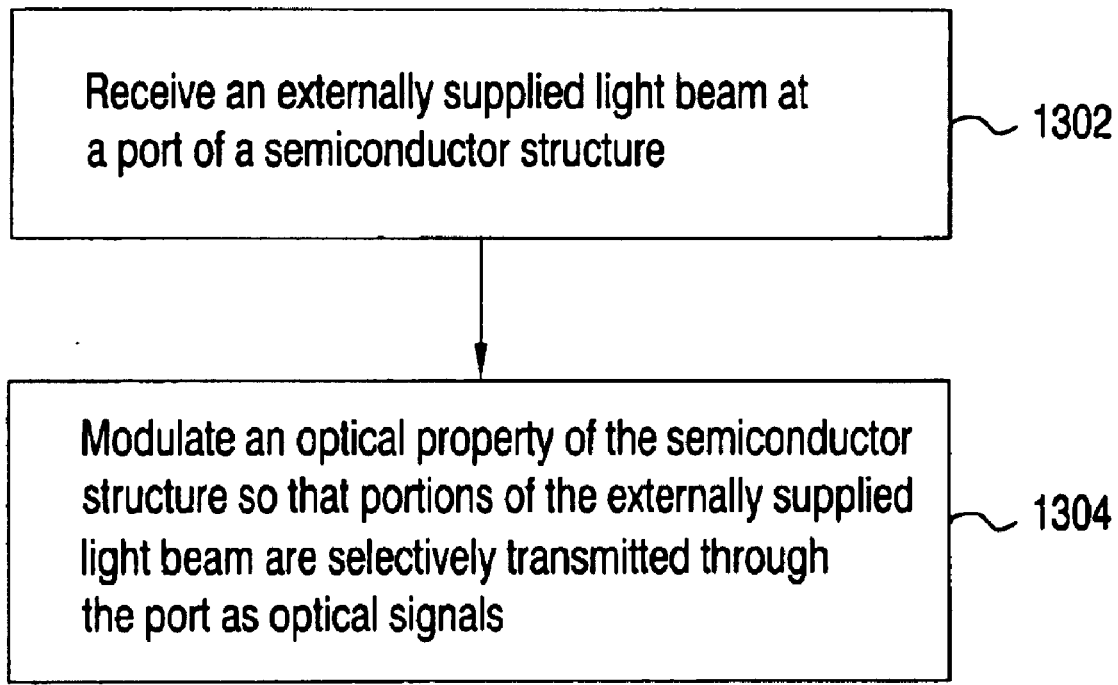
FIG. 13 is a flow diagram of a method of transmitting optical signals in accordance with an exemplary embodiment of the present invention.

A method of transmitting optical signals in accordance with an exemplary embodiment of the invention is described with reference to the flow diagram of FIG. 13. At step 1302, an externally supplied light beam is received at a port of a semiconductor structure. Next, at step 1304, an optical property of a controllable layer of the semiconductor structure is modulated to manipulate the externally supplied light beam within the semiconductor structure so that portions of the externally supplied light beam are selectively transmitted through the port of the semiconductor structure as optical signals. In this exemplary embodiment, the controllable layer is a layer of ECB material, which can be modulated between a passive state and an active state by applying and removing an electric field. The layer of ECB material functions as a quarter-wave plate in the active state. Within the semiconductor structure, the externally supplied light beam initially propagates through a walk-off layer and the controllable layer. The walk-off layer separates the externally supplied light beam into two orthogonal polarization components. The polarization components are then reflected off a mirror of the semiconductor structure. Consequently, the reflected polarization components propagate again through the controllable layer and the walk-off layer. When the optical property of the controllable layer is modulated into the passive state, the polarization components propagate through the controllable layer unaltered. Thus, the reflected polarization components are recombined by the walk-off layer and transmitted through the port of the semiconductor structure, which may include a single I/O aperture or a pair of input and output apertures in an opaque layer of the semiconductor structure. In contrast, when the optical property of the controllable layer is modulated into the active state, the two orthogonal polarization components are switched with respect to their polarized orientations. Thus, in the active state, the polarization components are not combined by the walk-off layer. Instead, the polarization components are further separated by the walk-off layer such that the polarization components impinge upon the opaque layer of the semiconductor structure. Therefore, in the active state, the polarization components are not transmitted through the port of the semiconductor structure.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A semiconductor structure for transmitting optical signals comprising:
    a semiconductor substrate;
    a port positioned over said semiconductor substrate to receive an externally supplied light beam;
    a reflective element positioned between said semiconductor substrate and said port to reflect said externally supplied light beam toward said port; and
    an optically active region positioned between said port and said reflective element, said optically active region having a controllable optical property to manipulate said externally supplied light beam such that portions of said externally supplied light beam can be selectively transmitted through said port as said optical signals.

2. The semiconductor structure of claim 1 wherein said optically active region includes
    a controllable layer having said controllable optical property to selectively retard at least one of polarization components of said externally supplied light beam, said controllable optical property being responsive to an electric field.

3. The semiconductor structure of claim 2 wherein said optically active region further includes a walk-off layer configured to displace a polarization component of said externally supplied light beam.

4. The semiconductor structure of claim 3 wherein said walk-off layer and said controllable layer each include a birefringent material.

5. The semiconductor structure of claim 2 further comprising a polarizing beamsplitter configured to selectively reflect a polarization component of said externally supplied light beam.

6. The semiconductor structure of claim 2 wherein said controllable layer can be configured to substantially operate as a quarter-wave plate.

7. The semiconductor structure of claim 2 further comprising an electrode layer positioned above said controllable layer, said electrode layer and said reflective element being configured to generate said electric field.

8. The semiconductor structure of claim 2 further comprising electrodes positioned adjacent to said controllable layer, said electrodes being configured to generate said electric field.

9. The semiconductor structure of claim 1 wherein said port includes a single aperture in an opaque layer positioned above said optically active region, said single aperture being positioned to receive said externally supplied light beam and transmit said portions of said externally supplied light beam.

10. The semiconductor structure of claim 1 wherein said port includes an input aperture and an output aperture in an opaque layer positioned above said optically active region, said input aperture being positioned to receive said externally supplied light beam, said output aperture being positioned to transmit said portions of said externally supplied light beam.

11. The semiconductor structure of claim 1 wherein said semiconductor substrate includes an indirect bandgap material.

12. A method of transmitting optical signals comprising:
    receiving an externally supplied light beam at a port of a semiconductor structure;
    reflecting said externally supplied light beam within said semiconductor structure toward said port; and
    modulating an optical property of said semiconductor structure to manipulate said externally supplied light beam so that portions of said externally supplied light beam are selectively transmitted through said port as said optical signals.

13. The method of claim 12 further comprising
    separating first and second polarization components of said externally supplied light beam, said first and second polarization components being orthogonal to each other and displacing one of said first and second polarization components of said externally supplied light beam depending on polarized orientations of said first and second polarization components, and wherein said reflecting includes reflecting said first and second polarization components of said externally supplied light beam toward said port.

14. The method of claim 13 wherein said separating of said first and second polarization components of said externally supplied light beam and said displacing of one of said first and second polarization components of said externally supplied light beam are performed by a walk-off birefringent layer of said semiconductor structure.

15. The method of claim 12 further comprising transmitting a particular polarization component of said externally supplied light beam and selectively reflecting said particular polarization component of said externally supplied light beam depending on polarized orientation of said particular polarization component, and wherein said reflecting includes reflecting said particular polarization component of said externally supplied light beam toward said port.

16. The method of claim 15 wherein said transmitting of said particular polarization component of said externally supplied light beam and said selectively reflecting of said particular polarization component of said externally supplied light beam are performed by a polarizing beamsplitter of said semiconductor structure.

17. The method of claim 12 wherein said modulating of said optical property of said semiconductor structure includes controlling an electric field within at controllable layer of said semiconductor structure to change said optical property of said semiconductor structure to a first state, said controllable layer being configured to substantially function as a quarter-wave plate when said semiconductor structure is changed to said first state.

18. The method of claim 12 wherein said modulating of said optical property of said semiconductor structure includes changing an electric field within a controllable layer of said semiconductor structure to change said optical property of said semiconductor structure.

19. The method of claim 12 wherein said receiving of said externally supplied light beam includes receiving said externally supplied light beam at an input aperture of an opaque layer of said semiconductor structure, and wherein said modulating of said externally supplied light includes modulating said externally supplied light beam such that said portions of said externally supplied light beam are selectively transmitted through an output aperture of said opaque layer of said semiconductor structure.

20. A semiconductor structure for transmitting optical signals comprising:

a semiconductor substrate;

an opaque layer positioned above said semiconductor substrate, said opaque layer having an input aperture to receive an externally supplied light beam;

a reflective element positioned below said opaque layer to reflect said externally supplied light beam; and a controllable layer positioned between said opaque layer and said reflective element, said controllable layer having a variable optical property to selectively retard polarization components of said externally supplied light beam such that portions of said externally supplied light beam can be selectively transmitted through said opaque layer as said optical signals by changing said variable optical property of said controllable layer.

21. The semiconductor structure of claim 20 further comprising a walk-off layer positioned above said controllable layer, said walk-off layer being configured to displace a particular polarization component of said externally supplied light beam.

22. The semiconductor structure of claim 21 wherein said walk-off layer and said controllable layer each include a birefringent material.

23. The semiconductor structure of claim 20 further comprising a polarizing beamsplitter positioned above said controllable layer, said polarizing beamsplitter being configured to selectively reflect a polarization component of said externally supplied light beam.

24. The semiconductor structure of claim 20 wherein said controllable layer is configured to substantially operate as a quarter-wave plate when said variable optical property of said controllable layer is changed to a first optical state.

25. The semiconductor structure of claim 24 further comprising an electrode layer positioned above said controllable layer, said electrode layer and said reflective element being configured to generate an electric field within said controllable layer to change said variable optical property of said controllable layer to said first optical state.

26. The semiconductor structure of claim 20 further comprising electrodes positioned adjacent to said uncontrollable layer, said electrodes being configured to generate an electric field within said controllable layer.

27. The semiconductor structure of claim 20 further comprising a drive circuit formed within said semiconductor structure, said drive circuit being configured to selectively provide voltages to generate an electric field within said controllable layer to change said variable optical property of said controllable layer.

28. The semiconductor structure of claim 20 wherein said opaque layer includes an output aperture to transmit said portions of said externally supplied light beam.

29. The semiconductor structure of claim 20 wherein said semiconductor substrate includes silicon.

* * * * *